United States Patent
Oechslen et al.

(10) Patent No.: US 11,894,748 B2
(45) Date of Patent: Feb. 6, 2024

(54) ELECTRIC MOTOR VEHICLE TRACTION MOTOR

(71) Applicant: Dr. Ing. h.c. F. Porsche Aktiengesellschaft, Stuttgart (DE)

(72) Inventors: Stefan Oechslen, Stuttgart (DE); Christian Koenen, Stuttgart (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 17/752,874

(22) Filed: May 25, 2022

(65) Prior Publication Data

US 2022/0385133 A1 Dec. 1, 2022

(30) Foreign Application Priority Data

Jun. 1, 2021 (DE) ...................... 10 2021 114 159.1

(51) Int. Cl.
*H02K 15/00* (2006.01)
*H02K 5/128* (2006.01)
*H02K 9/19* (2006.01)
*B60L 50/51* (2019.01)
*H02K 5/16* (2006.01)

(52) U.S. Cl.
CPC .............. *H02K 5/128* (2013.01); *B60L 50/51* (2019.02); *H02K 5/16* (2013.01); *H02K 9/19* (2013.01)

(58) Field of Classification Search
CPC .......... B60L 50/51; H02K 5/128; H02K 5/16; H02K 9/19; H02K 9/197; Y02T 10/64
See application file for complete search history.

(56) References Cited

U.S. PATENT DOCUMENTS

2012/0187670 A1    7/2012   Felipe De Souza Araujo et al.

FOREIGN PATENT DOCUMENTS

| DE | 4434448 A1 | * | 3/1996 | ......... F04D 13/0626 |
|----|---|---|---|---|
| DE | 4434448 A1 | | 3/1996 | |
| DE | 10025190 A1 | * | 12/2001 | ......... F04D 13/0626 |
| DE | 10025190 A1 | | 12/2001 | |
| DE | 10322465 A1 | * | 12/2004 | ........... F04D 13/025 |
| DE | 10322465 A1 | | 12/2004 | |
| DE | 102009032158 A1 | | 1/2011 | |
| DE | 202011103644 U1 | | 5/2012 | |
| EP | 2040354 A1 | * | 3/2009 | ......... B29C 45/0005 |
| WO | WO-9748167 A1 | * | 12/1997 | ........... F04D 29/588 |

OTHER PUBLICATIONS

DE-4434448-A1, Halm, all pages (Year: 1996).*
EP-2040354-A1, Hansen et al., all pages (Year: 2009).*
DE-10322465-A1, Kollmar, all pages (Year: 2004).*
WO-9748167-A1, Beunkenberg, all pages (Year: 1997).*
DE-10025190-A1, Stephan, all pages (Year: 2001).*

* cited by examiner

*Primary Examiner* — Naishadh N Desai

(74) *Attorney, Agent, or Firm* — LEYDIG, VOIT & MAYER, LTD.

(57) ABSTRACT

An electric motor vehicle traction motor, including: a liquid-cooled motor stator, a dry-running motor rotor, and a fluid-tight split cage which separates the motor stator and the motor rotor from one another fluidically, the split cage being formed by a fiber composite body, wherein the split cage is axially prestressed in a long-lasting manner by a split cage axial stressing apparatus.

10 Claims, 3 Drawing Sheets

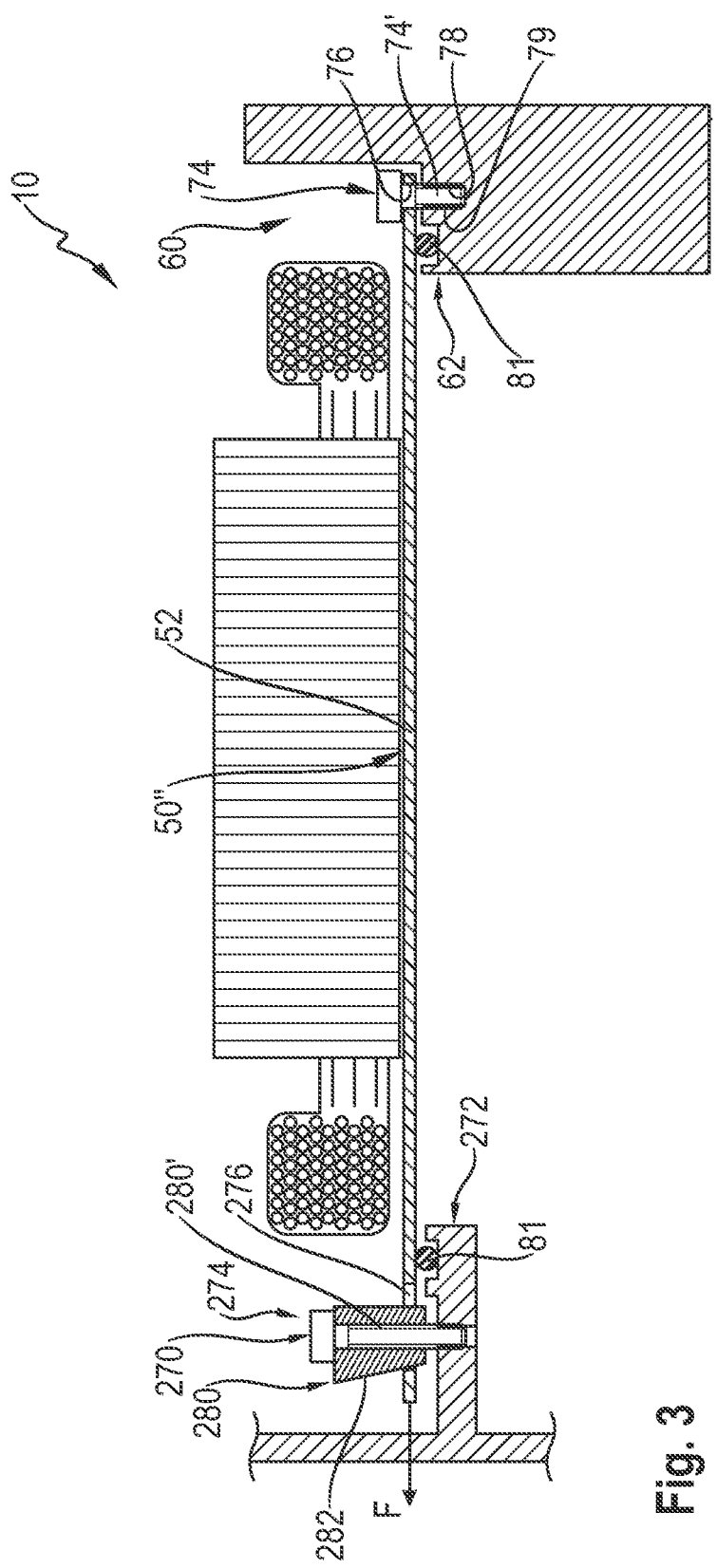
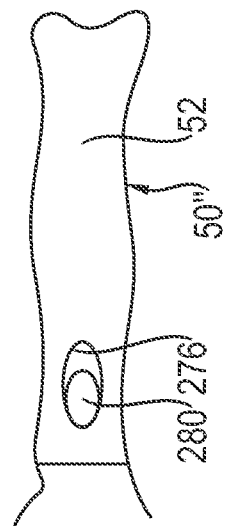
Fig. 3
Fig. 4

ELECTRIC MOTOR VEHICLE TRACTION MOTOR

CROSS REFERENCE TO RELATED APPLICATIONS

This application claims benefit to German Patent Application No. DE 10 2021 114 159.1, filed on Jun. 1, 2021, which is hereby incorporated by reference herein.

FIELD

The invention relates to an electric motor vehicle traction motor with a liquid-cooled motor stator, a dry-running motor rotor and a fluid-tight split cage which separates the motor stator and the motor rotor from one another fluidically.

BACKGROUND

An electric motor vehicle traction motor provides drive power outputs in the high 2-digit to 4-digit kilowatt range, with the result that high power losses in the form of heat occur, in particular, in the motor stator, in which the motor windings are arranged, which power losses have to be dissipated by means of liquid cooling. Therefore, electric motor vehicle traction motors of this type are constructed as what are known as canned motors, in the case of which the liquid-cooled motor stator is separated from the dry-running motor rotor fluidically by way of a split cage.

Different concepts are known for the split cage. For instance, the split cage or the split cage body can be of inherently stable configuration, that is to say can be rigid enough that the split cage maintains its shape and design outside the installed state. Moreover, it is not deformed by way of the liquid pressure of the cooling liquid in the stator space. The split cage can consist of a fiber composite material, as is known, for example, from DE 10 2009 032158 A1 or DE 20 2011 103 644 U1. A split cage of this type can be realized with a low material thickness, which makes a high degree of electrical efficiency of the traction motor possible on account of the relatively small radial gap enabled as a result between the motor stator and the motor rotor. A problem of a split cage which is formed from a fiber composite body is, however, its mechanical sensitivity in relation to deformations.

SUMMARY

In an embodiment, the present disclosure provides an electric motor vehicle traction motor, comprising: a liquid-cooled motor stator, a dry-running motor rotor, and a fluid-tight split cage which separates the motor stator and the motor rotor from one another fluidically, the split cage being formed by a fiber composite body, wherein the split cage is axially prestressed in a long-lasting manner by a split cage axial stressing apparatus.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 diagrammatically shows a longitudinal section of a third exemplary embodiment of an electric motor vehicle traction motor with an axial stressing apparatus with a plurality of wedge elements which engage into corresponding stressing openings of the split cage; and FIG. 4 diagrammatically shows an additional view of a wedge element according to an embodiment of the invention.

DETAILED DESCRIPTION

Figure 1:
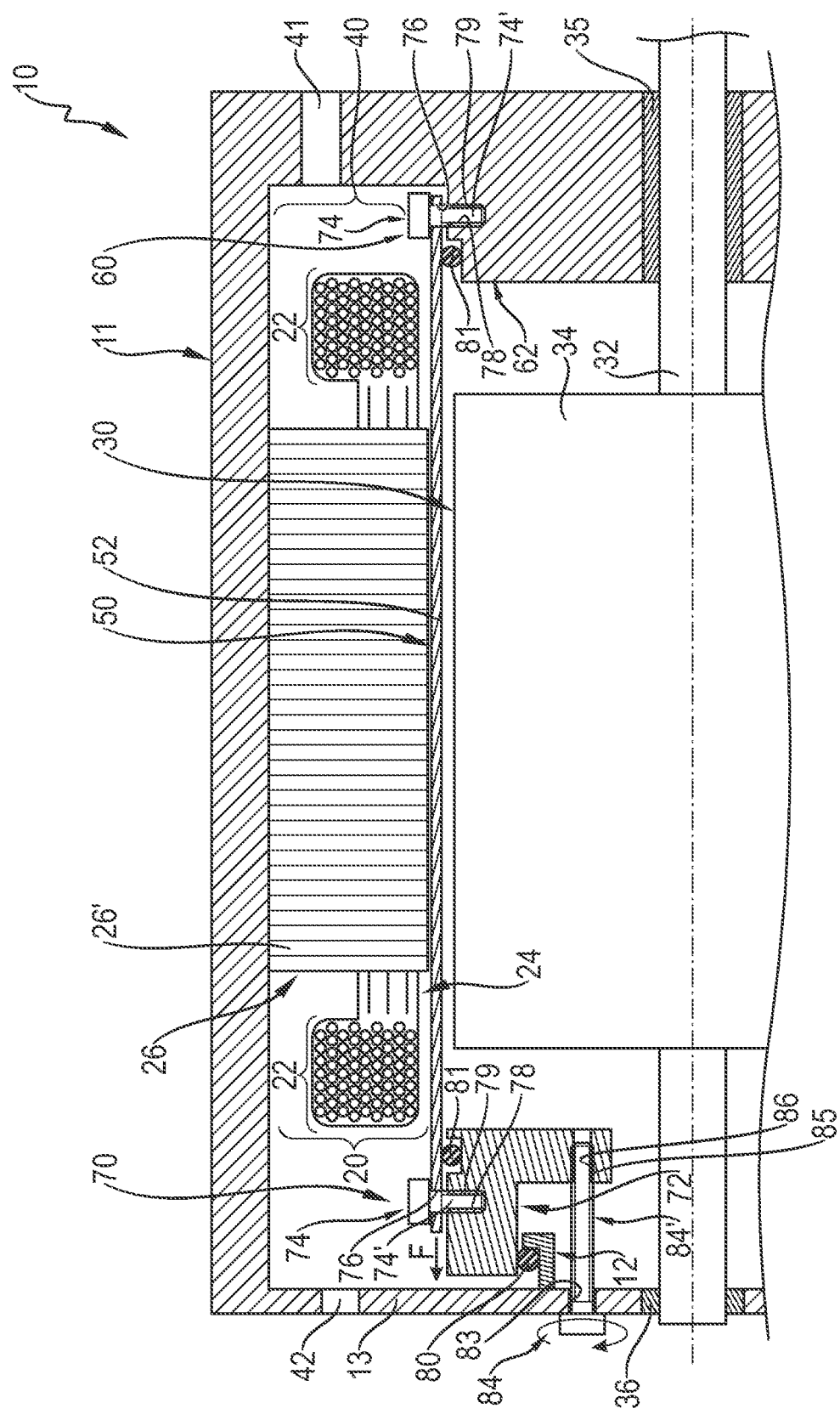
FIG. 1 diagrammatically shows a longitudinal section of a first exemplary embodiment of an electric motor vehicle traction motor with an axially displaceable axial stressing ring.

In contrast to conventional motors, embodiments of the present invention provide a robust electric motor vehicle traction motor with a high degree of efficiency.

In an embodiment, the electric motor vehicle traction motor according to the invention has a liquid-cooled motor stator and a dry-running motor rotor which is preferably configured as an internal rotor, with the result that the motor stator preferably surrounds the motor rotor in a ring-like manner. The liquid-cooled stator space, in which the motor stator is arranged, is separated fluidically by way of a fluid-tight split cage from the rotor space, in which the motor rotor is arranged. In the present case, the split cage is formed by a fiber composite body, that is to say, for example, by a body made from a fiber-reinforced plastic.

It is provided according to an embodiment of the invention that a split cage axial stressing apparatus is provided, by way of which the fiber composite body split cage is axially prestressed in a long-lasting manner. The split cage which consists of a fiber composite body can be realized in a relatively thin-walled manner. In particular, the fiber composite body can be realized by way of corresponding production methods, for example hardening on a mandrel, as a thin-walled split cage sleeve with a precisely manufactured inner circumferential wall. The fibers of the composite material are subjected to a tensile load by way of the long-term axial prestress of the fiber composite body split cage. In the case of an external action of force perpendicularly with respect to the local split cage plane, that is to say in the radial direction, the split cage is buckled only slightly, since the relatively high rigidity and the axial prestress of the fibers make a deformation difficult.

Since the split cage is formed from a relatively thin-walled fiber composite body, an annular gap between the motor stator and the motor rotor is likewise relatively small, with the result that a satisfactory degree of electrical efficiency is realized. A high mechanical robustness of the split cage with respect to radial actions of force is in turn realized by way of the axial prestress of the split cage. Advantages also result herefrom for the production and assembly of the traction motor, since, in particular, the split cage can be produced relatively inexpensively, and relatively low requirements also have to be made of the manufacturing accuracy of the motor stator, in particular of the laminated core of the motor stator.

One longitudinal end of the split cage is preferably fixed firmly to the motor housing, whereas the split cage axial stressing apparatus is provided at the other longitudinal end. As an alternative, however, it goes without saying that in each case one axial stressing apparatus can also be provided at the two longitudinal ends of the split cage.

The split cage axial stressing apparatus preferably has an axially displaceable axial stressing ring, to which one longitudinal end of the split cage is connected in a tension-resistant manner. The axial stressing ring can be positioned axially by way of at least one stressing element, with the result that the axial stressing ring can be pressed or pulled in the direction of the relevant axial longitudinal end of the traction motor, in order in this way to axially stress the split cage which is fastened to the axial stressing ring. As a result, the axial stress can be set highly precisely in the assembly process in a relatively simple manner and optionally from the outside.

A stressing ring seal is preferably arranged between the axial stressing ring and a guide flange, fixed to the housing, of the module housing. The stressing ring seal can be formed, for example, by way of an annular O-ring. As a result, the unavoidable annular gap between the axially movable axial stressing ring and the guide flange of the module housing is reliably sealed in a fluid-tight manner in the long-term.

At least one longitudinal end of the fiber composite body of the split cage is preferably held in a positively locking manner by way of a clamping arrangement. In this way, the holding forces can be distributed harmonically over the entire circumference of the split cage. The clamping arrangement preferably has an outer clamping ring and an inner clamping ring, the relevant end region of the split cage fiber composite body being braced or clamped radially between the two clamping rings. The outer clamping ring and/or the inner clamping ring can consist of a plurality of part clamping rings, for example of four part clamping rings of in each case 90°.

As an alternative to a clamping arrangement, a plurality of holding openings can be provided in the split cage fiber composite body at at least one longitudinal end, which holding openings are held by way of corresponding motor housing-side holding bolts with, for example, a radial extent. For this purpose, a corresponding strength of the split cage fiber composite body in the region of the holding openings is required. The holding bolts can be formed, for example, by threaded headed bolts which are screwed radially into a housing-side part.

The holding openings can be configured as stressing openings in the fiber composite body at the split cage longitudinal end, at which the axial stressing apparatus is provided, into which stressing openings a wedge element engages radially which can be tightened in the radial direction radially to the outside or radially to the inside. Here, the wedge face of the wedge element stresses the relevant opening edge of the stressing opening in the split cage fiber composite body.

A separate elastically deformable fluid sealing ring can be provided radially on the inner side of the split cage fiber composite body at at least one longitudinal end of the split cage, by way of which fluid sealing ring the gap between the split cage and the corresponding housing-side part is reliably closed in a fluid-tight manner.

The split cage is preferably widened in a funnel-like or conical manner at at least one longitudinal end, with the result that the internal radius at the widened longitudinal end of the fiber composite body is greater than the internal radius of the fiber composite body in the axial center of the split cage. A further increase in the radial load-bearing capacity of the split cage is achieved as a result. Furthermore, the flow conduction for the cooling liquid in the stator space can possibly be improved by way of a funnel-like widened portion of one longitudinal end or the two longitudinal ends of the split cage. The split cage fiber composite body is preferably of constantly cylindrical configuration even at the longitudinal ends before assembly, and is widened in a funnel-like or conical manner at the longitudinal ends only during the course of assembly.

The figures in each case diagrammatically show an electric motor vehicle traction motor 10 with a liquid-cooled motor stator 20 and a dry-running motor rotor 30. The motor rotor 30 is configured as what is known as an internal rotor, with the result that the motor stator 20 surrounds the central motor rotor 30 in a ring-like manner. The motor rotor 30 and the motor stator 20 are arranged within a motor housing 11, and are separated fluidically from one another by way of a fluid-tight split cage 50; 50'; 50". As a result, an annular stator space 14 is formed, in which the motor stator 20 is arranged and which is liquid-cooled continuously by way of a suitable cooling liquid during the motor operation. The cooling liquid flows through a cooling liquid inlet 41 at one motor longitudinal end into the stator space 40, and flows through a cooling liquid outlet 42 at the other motor longitudinal end out of the stator space 40.

The motor stator 20 is formed substantially by a stator laminated core 26 which is formed from a multiplicity of stator laminations 26', and a multiplicity of stator coils 24, each stator coil 24 having, at its longitudinal ends, in each case coil heads 22 (also called winding heads) which protrude out of the stator laminated core 26. The motor rotor 30 which is shown diagrammatically in the present case has a rotor shaft 32 which is mounted rotatably at its two longitudinal ends in each case in a shaft bearing 35, 36. The rotor shaft 32 supports an electromagnetic motor rotor body 34 which can be, for example, of permanently magnetic configuration.

In all three exemplary embodiments, the split cage 50; 50'; 50" is formed in each case by a fiber composite body 52 which is of constantly hollow-cylindrical configuration before assembly. The fiber composite body 52 is relatively thin-walled and can be produced in various ways, for example by way of wet winding or dry winding. The winding of the fiber composite body 52 can take place on a mandrel, as a result of which a high dimensional accuracy of the inner wall of the fiber composite body can be realized.

In the assembled state, the split cage 50, 50', 50" is axially prestressed in the long term by way of a split cage axial stressing apparatus 70; 170; 270. The axial stressing apparatus 70; 170; 270 is arranged in each case at a longitudinal end of the split cage 50; 50'; 50", while the other longitudinal end of the split cage 50; 50'; 50" is held by a located bearing 60; 160 fixedly on the housing and such that it cannot be moved axially. The fiber composite body 52 can have a lower coefficient of thermal expansion than the housing 11, with the result that the axial stress of the split cage 50; 50'; 50" increases in the case of heating. An identical (or at least similar) coefficient of thermal expansion is preferred.

Figure 2:
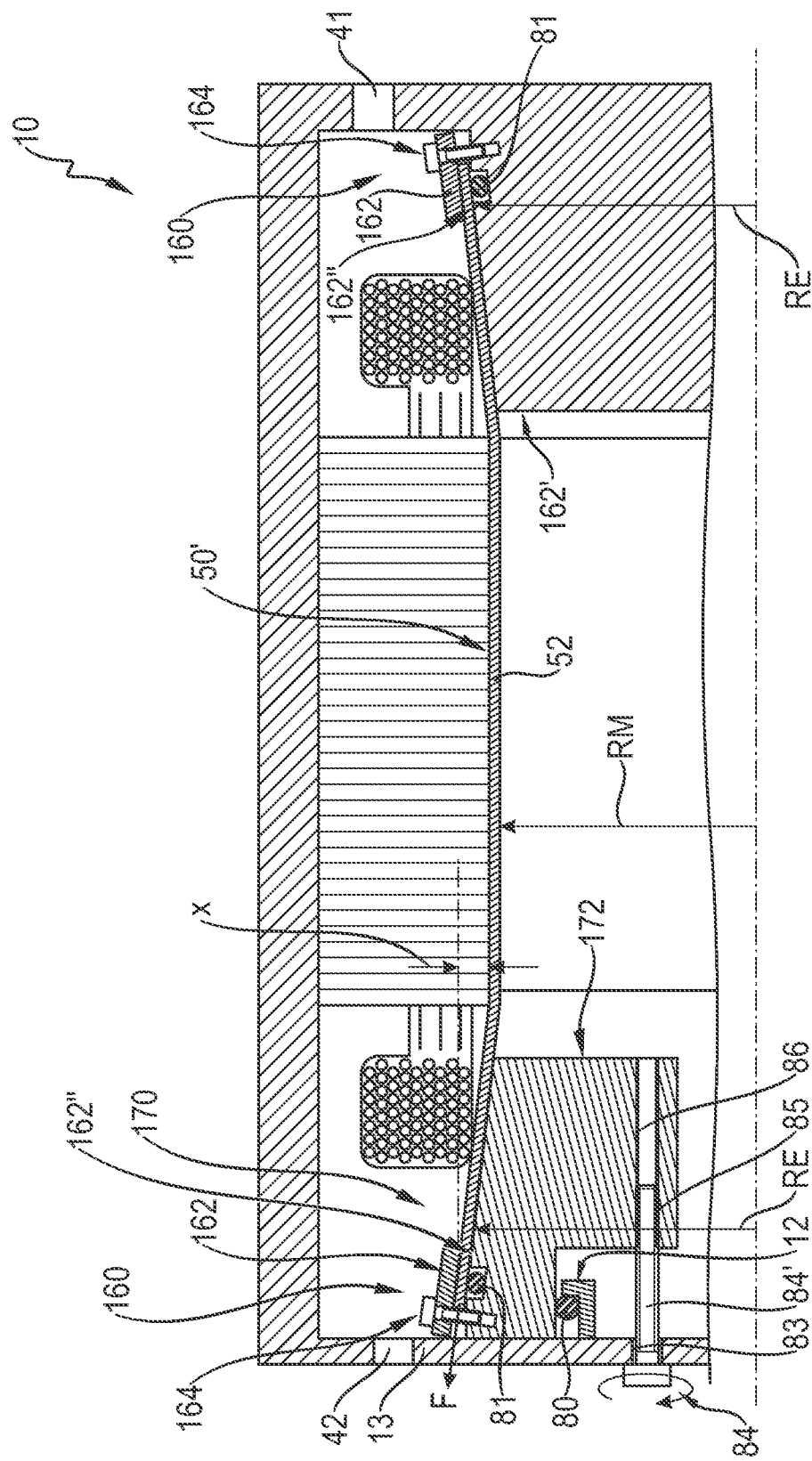
FIG. 2 diagrammatically shows a longitudinal section of a second exemplary embodiment of an electric motor vehicle traction motor with a clamping arrangement for fixing the fiber composite body in a non-positive manner and with a funnel-like widened portion of the split cage at the two split cage longitudinal ends.

In the three exemplary embodiments, two different forms of fixing of the split cage longitudinal ends are shown. As shown in FIG. 2, a clamping arrangement 160 can be provided in each case at the two longitudinal ends, by way of which clamping arrangement 160 the two longitudinal ends of the split cage fiber composite body 52 are held in a non-positive manner and with a largely homogeneous force distribution over the entire circumference. The clamping arrangement 160 has in each case one inner clamping ring 162' and one radially outer clamping ring 162, the relevant end region of the split cage fiber composite body 52 being clamped in fixedly between the two clamping rings 162, 162' in such a way that the non-positive connection between the two clamping rings 162, 162' and the clamped-in ring faces of the split cage fiber composite body 52 can transmit high axial stressing forces. The outer clamping ring 162 is pressed radially onto the inner clamping ring 162' by way of a clamping ring fixing screw 164, with the result that the relevant longitudinal end of the split cage fiber composite body 52 is clamped in homogeneously. The outer clamping ring 162 can be configured in multiple parts, with the result that four clamping ring part rings of in each case approximately 90° are provided over the circumference, for example.

FIGS. 1 and 3 show another embodiment for fixing the split cage longitudinal end on a housing-side part, namely a classic screw connection arrangement 74. The screw connection arrangement 74 is formed in each case by a multiplicity of openings 76 which are distributed in a ring-like manner over the relevant end region of the split cage fiber composite body 52. In each case one threaded headed screw 74' is plugged in each opening 76, which threaded headed screw 74' is screwed with its external thread 79 in each case into a corresponding internal thread 78 of a housing-side outer-cylindrical annular flange 62. An elastomeric sealing ring 81 is arranged in each case between the annular flange 62 and the inner side of the split cage fiber composite body 52, which sealing ring 81 is provided directly axially adjacently with respect to the screw connection.

FIG. 1 shows a first embodiment of a split cage axial stressing apparatus 70. The axial stressing apparatus 70 consists substantially of an axially displaceable and movable axial stressing ring 72 which is guided in a radially fixed and axially displaceable manner by an annular guide flange 12 which is fixed to the housing. The axial stressing ring 72 can be adjusted in the axial direction via a plurality of stressing screws 84 which are distributed over the circumference. The stressing screws 84 are plugged with the screw shank 84' in each case through an axial bore 83 of a motor housing end wall 13, and engage with their respective external thread 85 into a corresponding axial internal thread 86 of the axial stressing ring 72. By way of rotation of the stressing screws 84, the axial stressing ring 72 can be moved axially in the distal stressing direction F and, as a result, the split cage fiber composite body 52 can be stretched axially and can be stressed axially. A stressing ring seal 80 which is formed by an elastic O-ring is arranged between the guide flange 12 and the axial stressing ring 72.

FIG. 2 shows a second exemplary embodiment of the split cage axial stressing apparatus 170 which differs from the axial stressing apparatus 70 of FIG. 1 only in one detail: the supporting face 162' of the axial stressing ring 172 is configured with an external cone, with the result that the relevant longitudinal end of the split cage 50' is widened in a funnel-like manner. The locating bearing-side longitudinal end of the split cage fiber composite body 52 is also likewise widened in a funnel-like manner, since the relevant flange 162' which is fixed to the housing is also of funnel-like configuration on an outer circumferential side here. In this way, the internal radius RE at the two widened split cage longitudinal ends is greater than the internal radius RM in the axial center of the split cage 50', for example is greater by at least 3%.

FIG. 3 shows a third embodiment of the split cage axial stressing apparatus 270 which is formed by a plurality of stressing openings 276, distributed in a ring-like manner over the circumference, in the fiber composite body 52 and a corresponding number of wedge elements 280 which in each case engage radially into one of the elliptical stressing openings 276. Each wedge element 280 has a wedge face 282 on its distal end side. The wedge element 280 can be adjusted in its radial position by way of a stressing screw 274, as a result of which the fiber composite body 52 is stressed axially in the stressing direction F. The stressing screw 274 is screwed radially into an annular guide flange 272 which is fixed to the housing.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electric motor vehicle traction motor, comprising:
a liquid-cooled motor stator;
a dry-running motor rotor; and
a fluid-tight split cage which separates the motor stator and the motor rotor from one another fluidically, the split cage being formed by a fiber composite body, wherein the split cage is axially prestressed by a split cage axial stressing apparatus.

2. The electric motor vehicle traction motor as claimed in claim 1, wherein the split cage axial stressing apparatus comprises an axially displaceable axial stressing ring to which one longitudinal end of the split cage is connected in a tension-resistant manner, and wherein the axial stressing ring is positioned axially by a stressing element.

3. The electric motor vehicle traction motor as claimed in claim 1, wherein at least one longitudinal end of the fiber composite body of the split cage is held in a positively locking manner by a clamping arrangement.

4. The electric motor vehicle traction motor as claimed in claim 1, wherein the fiber composite body of the split cage has, at one or more longitudinal ends, a plurality of holding openings which are held by corresponding holding bolts.

5. The electric motor vehicle traction motor as claimed in claim 1, wherein the split cage is widened in a funnel-like manner at one or more longitudinal ends forming a widened longitudinal end, and wherein an internal radius at the widened longitudinal end of the fiber composite body is greater than the internal radius in the axial center of the split cage.

6. The electric motor vehicle traction motor as claimed in claim 1, wherein the axial stressing apparatus is formed by a plurality of stressing openings in the fiber composite body and wherein a plurality of wedge elements are each configured to radially engage one of the plurality of stressing openings and can each be tightened in a radial direction.

7. The electric motor vehicle traction motor as claimed in claim 1, comprising a fluid sealing ring arranged radially on an inner side of the fiber composite body at one or more longitudinal ends of the split cage.

8. The electric motor vehicle traction motor as claimed in claim 3, the clamping arrangement having an outer clamping ring and an inner clamping ring, the at least one longitudinal end of the fiber composite body being clamped radially between the outer clamping ring and the outer clamping ring.

9. The electric motor vehicle traction motor as claimed in claim 2, comprising a clamping ring seal arranged between the axial stressing ring and a guide flange of a motor housing.

10. The electric motor vehicle traction motor as claimed in claim 1, wherein the axial stressing apparatus includes a radially extending screw configured to secure the fiber composite body to the axial stressing apparatus, and wherein the radially extending screw is configured to axially prestress the fiber composite body when the axial stressing apparatus is displaced in an axial direction of the electric motor vehicle traction motor.

\* \* \* \* \*